United States Patent [19]

Kimata et al.

[11] Patent Number: 4,975,976
[45] Date of Patent: Dec. 4, 1990

[54] IMAGE TRANSFORMATION METHOD AND DEVICE

[75] Inventors: Naohiro Kimata; Takayoshi Yoshida; Ikuo Oyake, all of Tokyo, Japan

[73] Assignee: Oki Electric Industry Co., Ltd., Japan

[21] Appl. No.: 407,936

[22] Filed: Sep. 15, 1989

[30] Foreign Application Priority Data

Sep. 20, 1988 [JP] Japan .................................. 233637

[51] Int. Cl.$^5$ .............................................. G06K 9/00
[52] U.S. Cl. ........................................... 382/44; 382/42
[58] Field of Search ...................... 382/44, 22, 45, 46, 382/47, 28; 364/521

[56] References Cited

U.S. PATENT DOCUMENTS

| | | | |
|---|---|---|---|
| 4,602,285 | 7/1986 | Beaulier et al. | 382/44 |
| 4,672,680 | 6/1987 | Middleton | 382/44 |
| 4,720,871 | 1/1988 | Chambers | 382/42 |
| 4,774,678 | 9/1988 | David et al. | 382/45 |
| 4,829,446 | 5/1989 | Draney | 382/44 |

Primary Examiner—Leo H. Boudreau
Assistant Examiner—Yon Jung
Attorney, Agent, or Firm—Edward D. Manzo

[57] ABSTRACT

A rectangular source image formed by pixels in a two-axis coordinate system is transformed to a destination image by mapping vertices of the source image onto vertices of the destination image, then mapping edges of the destination image onto edges of the source image, mapping scan lines in the destination image onto the source image, and assigning to pixels on these scan lines the values of corresponding pixels in the source image. DDA algorithms are employed for the edge mapping and scan line mapping steps. This method enables arbitrary affine transformations, including combinations of a rotation with an enlargement or reduction, to be executed without introducing image defects.

19 Claims, 5 Drawing Sheets

IMAGE TRANSFORMATION METHOD AND DEVICE

BACKGROUND OF THE INVENTION

This invention relates to a method of performing image transformation such as enlargement, reduction, and rotation on a rectangular image, and to a device for carrying out this method.

The need to perform such image transformations arises frequently in fields such as computer graphics, computeraided design, and desktop publishing. Such transformations are used, for example, to display letters, symbols, and other images in arbitrary sizes and orientations. Mathematically, these transformations belong to the class of affine transformations, and can be executed in a straightforward manner by matrix multiplication.

Matrix multiplication is a computationally slow process, however, so it is desirable to execute the transformation by a faster method. Faster methods can be achieved by employing well-known digital differential analyzer (DDA) algorithms.

The prior art regarding application of DDA algorithms to these transformations has been described in, for example, a Technical Paper of the Institute of Electronics and Communication Engineers of Japan (Vol. 83, No. 195, EC83-34, Nov. 24, 1983) explaining the processing method of the MN8614 Image Processor.

The prior art disclosed in this reference operates on a source image comprising a rectangular array of pixels, generating a destination image also comprising an array of pixels. The prior art can be summarized as follows.

For a reduction transformation, a DDA algorithm is applied to map a horizontal or vertical source line of M pixels onto a horizontal or vertical destination line of N pixels, where $M > N$. The mapping is thus many-to-one, each destination pixel corresponding to one or more source pixels. When a destination pixel corresponds to more than one source pixel, the values of those source pixels are combined by OR logic to produce the value of the destination pixel. The reduction ratio is N/M.

For an enlargement transformation, the same procedure is applied in reverse, producing a one-to-many mapping of the source image onto the destination image. The value of each source pixel is transferred to one or more destination pixels.

For a rotation, the reduction procedure is applied twice to a horizontal line of source pixels to generate the x- and y-coordinates of a line of destination pixels. The reduction ratios are the cosine and sine of the angle of rotation.

Problems arise when this method is used to perform a simultaneous rotation and enlargement, however, or a simultaneous rotation and reduction. The basic reason is that the rotation transformation does not generate continuous horizontal or vertical lines of pixels, which could be correctly enlarged or reduced, but instead generates oblique lines which are not suitable for the enlargement or reduction process. The visible results are image defects such as pixel drop-outs.

SUMMARY OF THE INVENTION

It is accordingly an object of the present invention to perform image transformations without introducing image defects.

An image transformation method transforms a rectangular source image formed by pixels in a two-axis coordinate system to a destination image formed by pixels disposed on scan lines by mapping vertices of the source image onto vertices of the destination image, then mapping edges of the destination image onto edges of the source image, mapping scan lines in the destination image onto lines in the source image, and assigning to pixel on these scan lines the values of corresponding pixels in the source image. Finally, the destination image is displayed by scanning according to the scan lines.

An image transformation device comprises a source image memory for storing a source image, a destination image memory for storing a destination image, affine transformation means for performing an affine transformation on vertices of the source image to generate vertices of the destination image, edge mapping means for mapping pixels on edges of the destination image to pixels on edges of the source image, scan line mapping means for mapping pixels on scan lines in the destination image to pixels on lines in the source image, controller means for controlling the affine transformation means, edge mapping means, and scan line mapping means and transferring pixel values from the source image memory to the destination image memory as indicated by the scan line mapping means, a data bus for interconnecting the source image memory, destination image memory, and controller means, and display means for displaying images stored in the destination image memory.

DETAILED DESCRIPTION OF THE EMBODIMENTS

A novel image transformation method for transforming a rectangular source image to a destination image will be described below. The source image is formed by pixels in a two-axis coordinate system, the pixels being located at positions with integer coordinates. The pixels having values denoting, for example, different colors or intensity levels. The two axes will be denoted the x-axis and y-axis. The destination image is formed by pixels in a similar two-axis coordinate system. The destination image will be displayed by scanning it along scan lines on which the pixels are disposed. The scan lines are oriented parallel to the x-axis of the destination coordinate system, and perpendicular to the y-axis.

The transformations to be performed are affine in nature; that is, they transform parallel lines into parallel lines. Enlargements, reductions, and rotations are examples of affine transformations. Other examples include reflections, translations, shearing transformations, and product transformations generated by combining any of the above.

Figure 1:
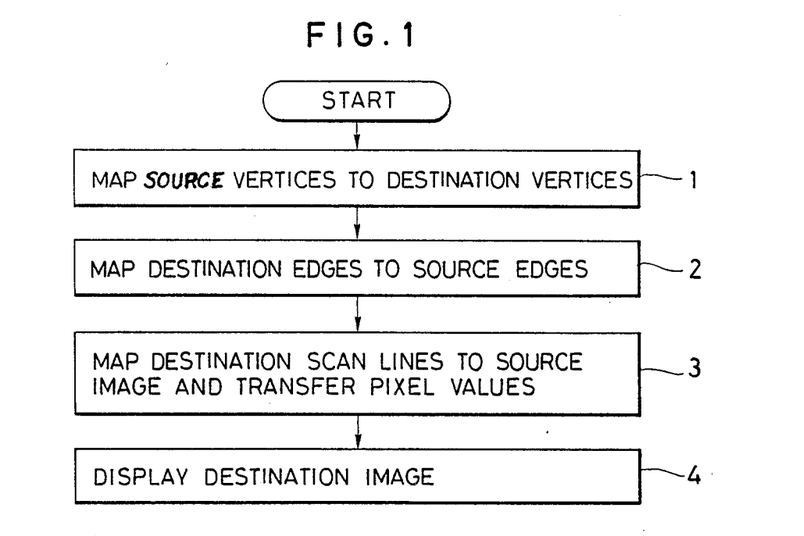
FIG. 1 is a general flowchart of a novel image transformation method.

First a general description of the method will be given with reference to FIG. 1. As shown in FIG. 1, the method comprises four steps.

The first step 1 is a vertex mapping step for mapping vertices of the source image onto the destination coordinate system, where they become vertices of the destination image. This step will be described in greater detail later with reference to FIG. 4.

The second step 2 is an edge mapping step for mapping edges of the destination image onto edges of the source image. This step will be described in greater detail later with reference to FIG. 5.

The third step 3 is a scan line mapping step for mapping scan lines in the destination image onto lines in the source image, and assigning to pixels on the scan lines the values of corresponding pixels in the source image. This step will be described in greater detail later with reference to FIG. 6.

The fourth step 4 is a display step for displaying the destination image by scanning it according to the scan lines and sending the scanned pixel values to a raster output device such as a cathode-ray-tube display. Methods of display are well known, so further description of this step will be omitted.

In the first three steps, to map a first entity onto a second entity means to generate a list of elements of the second entity corresponding to elements of the first entity. In this invention the elements of interest are pixels defined by x-y coordinates, and a mapping can be characterized as a process that generates a list of coordinates of pixels in the second entity.

Figure 2:
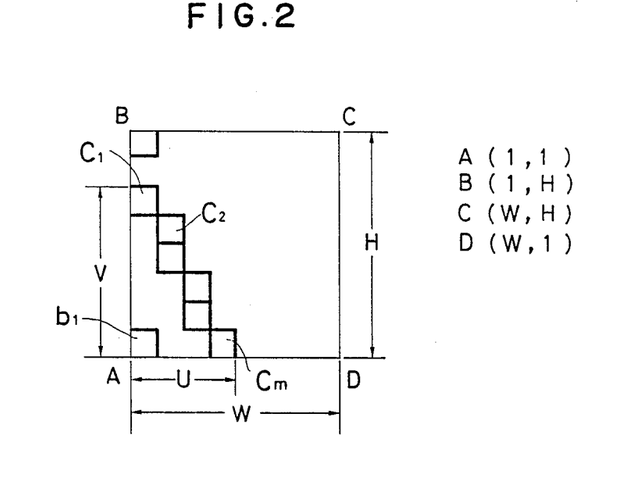
FIG. 2 shows an example of a source image area.
Figure 3:
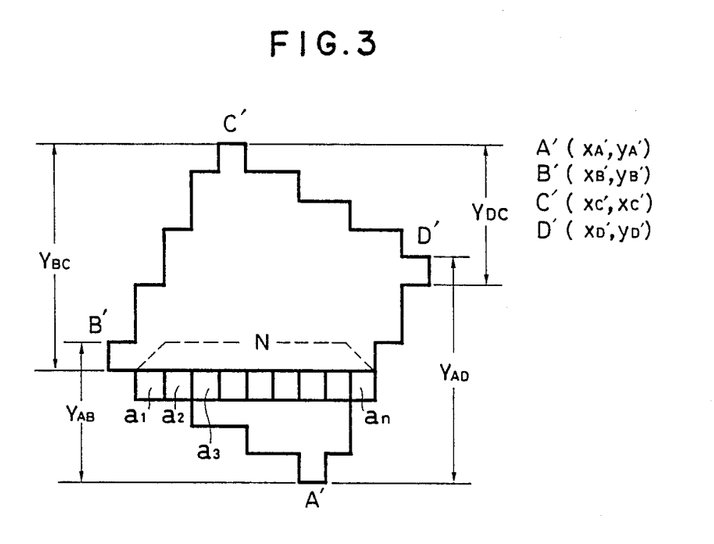
FIG. 3 shows an example of a destination image area.

An example of a transformation performed by the preceding steps is shown schematically in FIGS. 2 and 3. The source image is shown in FIG. 2; the destination image in FIG. 3. The transformation in this example is the product of a rotation and an enlargement. FIGS. 2 and 3 are schematic in nature, showing only the boundaries of the two images and a line of pixels in each. The image itself, as represented by the pixel values, is not shown.

The first step maps the vertices of the source image (A, B, C, and D in FIG. 2) to the vertices of the destination image (A′, B′, C′, and D′ in FIG. 3). That is, given the coordinates of the points A, B, C, and C, it calculates the coordinates of the points A′, B′, C′, and D′.

The second step maps the edges of the destination image onto the edges of the source image. For example, it maps the pixel $a_1$ in FIG. 3 to the pixel $c_1$ in FIG. 2, and the pixel $a_n$ to the pixel $c_m$. The mapping of vertex pixels is known from the preceding step; the mapping of other edge pixels can be calculated by a DDA algorithm, as will be described later. Preferably, for each edge of the destination image, only one pixel is mapped for each scan line meeting the edge, this being the pixel at the end of the scan line within the destination image. For example, although the pixel $a_1$ is mapped to the pixel $c_1$, the pixel $a_2$ is not mapped in this step.

The third step maps pixels disposed on a scan line such as $a_1, a_2, \ldots, a_n$ in the destination image to a line of pixels such as $c_1, c_2, \ldots, c_m$ in the source image. The mapping of the end pixels $a_1$ and $a_n$ is already known from the previous step; the mapping of interior pixels can be calculated by a DDA algorithm, as will be described later In this example, since the transformation comprises an enlargement, there are more destination pixels than source pixels, so the mapping is many-to-one. The pixels $a_2$ and $a_3$, for example, might both be mapped to the pixel $c_2$.

The third step also transfers pixel values, the transfer being reverse in direction to the mapping direction. For example, the value of the pixel $c_1$ is transferred to the pixel $a_1$, the value of the pixel $c_2$ is transferred to the pixels $a_2$ and $a_3$, and so on.

An advantage of the novel method is that every pixel in the destination image receives the value of a pixel in the source image. Another advantage is that the values of pixels on scan lines in the destination image are derived from lines of pixels in the source image in a natural. continuous way. This avoids image defects such as pixel drop-outs that occurred in the prior art.

A more detailed description of the first three steps of the novel method will next be given with reference to FIGS. 4 to 6. These drawings and the accompanying descriptions should be understood as exemplary and not restrictive in nature.

Figure 4:
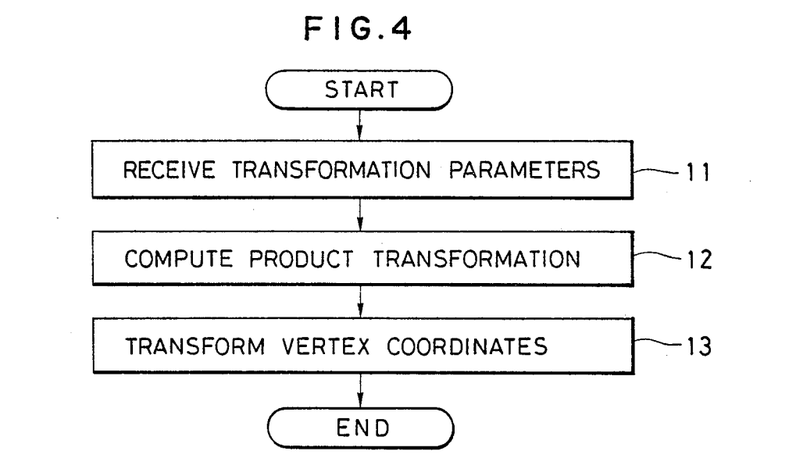
FIG. 4 is a more detailed flowchart illustrating the first step in FIG. 1.

FIG. 4 is a flowchart illustrating step 1 in FIG. 1.

In the first step 11 in FIG. 4, parameters describing one or more affine transformation are received. The parameters may take the form of elements of matrices describing the transformations.

In the next step 12, the received parameters are combined to generate a product transformation. This can be done, for example, by multiplying the matrices to obtain a product matrix.

In the next step 13 the product transformation is applied to the vertices of the source image. For example, the coordinates of the vertices of the source image are multiplied by the product matrix, thus computing the coordinates of the vertices of the destination image. Methods of matrix multiplication are well known.

Figure 5:
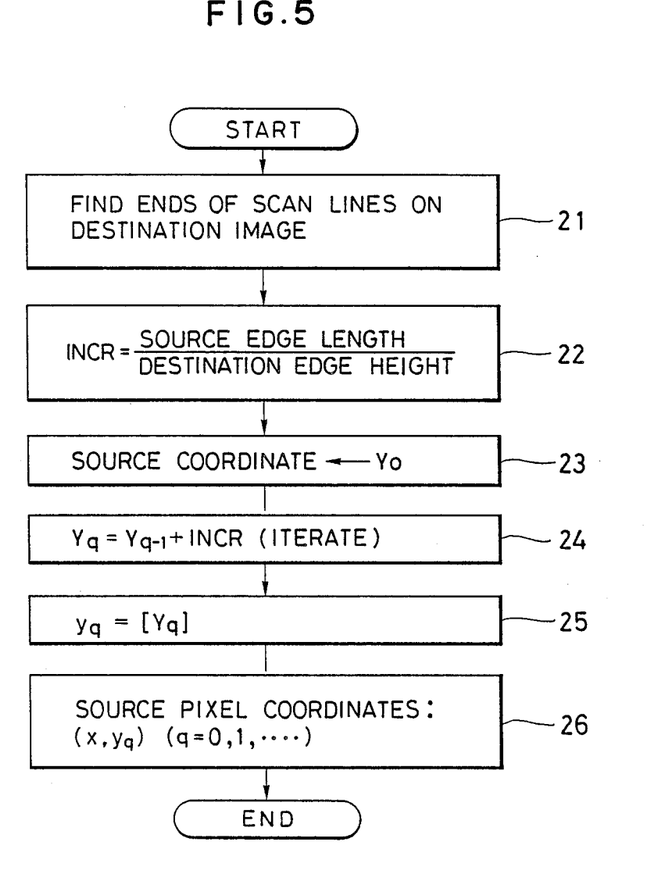
FIG. 5 is a more detailed flowchart illustrating the second step in FIG. 1.

FIG. 5 is a flowchart illustrating step 2 in FIG. 1. More specifically, it illustrates the use of a type of DDA algorithm in carrying out step 2 in FIG. 1.

The first step 21 in FIG. 5 computes the coordinates of the ends of the scan lines in the destination image. The computation can be performed for each edge of the destination image by a process of linear interpolation between the two vertices joined by the edge. Details will be apparent to one skilled in the art.

The next step 22 computes an increment value. This computation can also be performed separately for each edge of the destination image. Specifically, the height of the edge is divided into the length the corresponding edge of the source image. For the edge A′B′ in FIG. 3, for example, the height $Y_{AB}$ is divided into the lenght H of the corresponding edge AB in FIG. 2. The relevant formula is:

$$INCR = H/Y_{AB} = H/(y'_B - y'_A + 1)$$

where $y'_A$ is the y-coordinate of vertex A′, $y'_B$ is the y-coordinate of vertex B′, and INCR is the increment value. Note that height refers to extent in the y-direction, perpendicular to the scan lines.

The next step 23 initializes a source coordinate. This computation can also be performed once for each edge of the destination image. If the corresponding edge of the source image is parallel to the y-axis, the source coordinate is initialized to the y-coordinate of a vertex of that edge, plus one-half the increment value determined in the preceding step. Again taking the edge A′B′ in FIG. 3, which corresponds to the edge AB in FIG. 2, as an example:

$$Y_0 = 1 + (\tfrac{1}{2})INCR$$

where $Y_0$ is the value to which the source coordinate is initialized and 1 is the y-coordinate of vertex A. If the corresponding edge of the source image is parallel to the x-axis, the x-coordinate is used instead of the y-coordinate.

The next step 24 iteratively updates the source coordinate by adding the increment value, thus generating a series of source coordinates $Y_q$, where:

$$Y_q = Y_{q-1} + \text{INCR}$$

The next step 25 takes the integer parts of the updated source coordinates. Using brackets to represent the integer part of an arbitrary number, this can be written as:

$$Y_q = [Y_q]$$

The next step 26 obtains the coordinates of corresponding pixels on the edges of the source image according to these integer parts. That is, it supplements the integer parts of the source coordinates generated in the preceding step by supplying the other coordinate, which is constant for each edge of the source image. For the edge AB in FIG. 2 the other coordinate (x-coordinate) is 1, so pixels on the edge A'B' of the destination image at the ends of the scan lines are mapped to the pixels $(1, y_q)$ in source image.

Figure 6:
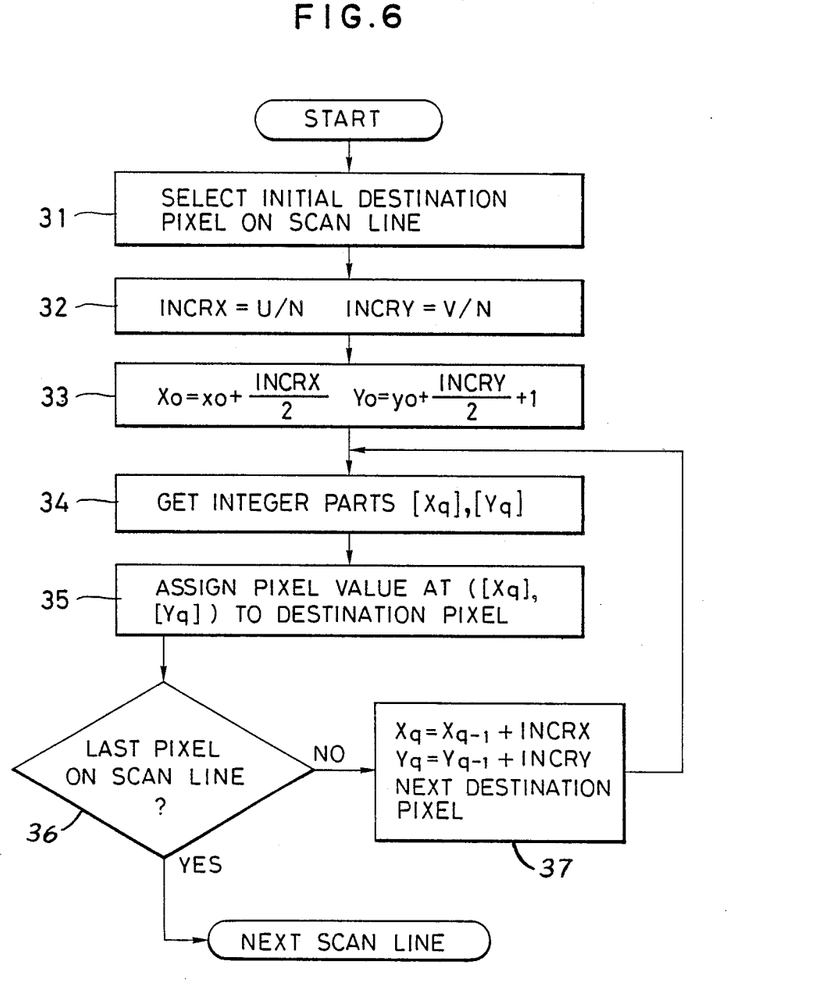
FIG. 6 is a more detailed flowchart illustrating the third step in FIG. 1.

FIG. 6 is a flowchart illustrating step 3 in FIG. 1. This flowchart also illustrates the application of a DDA algorithm.

The first step 31 in FIG. 6 selects an initial destination pixel on a scan lines in the destination image, such as the pixel $a_1$ in FIG. 3.

The next step 32 calculates a pair of increment values by dividing the length of this scan line in the destination image into the directed lengths along the x-and y-axes of the corresponding line in the source image. In FIG. 3 the scan line under consideration extends from the pixel $a_1$ to the pixel $a_n$, and its length is denoted by the letter N. The corresponding line in FIG. 2 extends from the pixel $c_1$ to the pixel $c_m$, these two pixels being known from step 2 in FIG. 1. The lenth of this line along the x-axis is denoted by the letter U and is directed in the positive direction, since the pixel $c_1$ is to the left of the pixel $c_m$. Its length along the y-axis is denoted by the letter V and is directed in the negative direction, since the pixel $c_1$ is above the pixel $c_m$. The pair of increment values, denoted INCRX and INCRY, can be calculated as follows:

$$\text{INCRX} = U/N = (x_{U-1} - x_0 + 1)/(x'_{N-1} - x'_0 + 1)$$

$$\text{INCRY} = -V/N = -(y_0 - y_{V-1} + 1)/(x'_{N-1} - x'_0 + 1)$$
$$= (y_{V-1} - y_0 - 1)/(x'_{N-1} - x'_0 + 1)$$

where $x_{U-1}$ and $x_0$ are the x-coordinates of the pixels $c_m$ and $c_1$, respectively; $x'_{N-1}$ and $x'_0$ are the x-coordinates of the pixels $a_n$ and $a_1$, respectively; and $y_{V-1}$ and $y_0$ are the y-coordinates of the pixels $c_1$ and $c_m$, respectively.

The next step 33 initializes a pair of source coordinates by adding half the values of the pair of increment values found in the preceding step to coordinates of a pixel at one end of the corresponding line in the source image. A further value of one is added to the y-coordinate. With $x_0$ and $y_0$ as above, a pair of initial source coordinates $X_0$ and $Y_0$ can be calculated as follows:

$$X_0 = x_0 + (\tfrac{1}{2}) \text{INCRX}$$

$$Y_0 = y_0 + (\tfrac{1}{2}) \text{INCRY} + 1$$

The next step 34 takes the integer parts of the pair of source coordinates. Initially these are $[X_0]$ and $[Y_0]$.

The next step 35 assigns to the destination pixel the value of the pixel in the source image at the location specified by the integer parts of the pair of source coordinates. Initially, $[X_0]$ and $[Y_0]$ are the same as $x_0$ and $y_0$, so the value of the pixel $c_1$ is assigned to the pixel $a_1$.

The next step 36 decides whether the destination pixel is the last pixel on the scan line in the destination image. For the scan line under consideration in FIG. 3, for example, the x-coordinate of the destination pixel can be compared with the x-coordinate of the pixel $a_n$ to make this decision.

In the next step 37, if the destination pixel is not the last pixel on the scan line, the pair of source coordinates are updated by adding the pair of increment values. The general formula for this is:

$$X_q = X_{q-1} + \text{INCRX}$$

$$Y_q = Y_{q-1} + \text{INCRY}$$

Then the next destination pixel $a_q$ on the scan line is selected and the process returns to step 34. Steps 34 and 35 now assign the value of the pixel with coordinates $[X_q]$ and $[Y_q]$ to the pixel $a_q$.

The process from step 34 to 37 is repeated until an affirmative result is obtained in step 36, at which point the mapping of the scan line is completed. The entire process, starting from step 31, can then be repeated for succeeding scan lines, until all scan lines intersecting the destination image have been mapped.

Although FIG. 1 shows step 3 being performed after step 2, it is clear from the foregoing discussion that these two steps have certain parts in common and can be performed in parallel. For example, successive scan lines can be selected from the top of the destination image to the bottom. For a given scan line, the two pixels at the extreme edges of the destination image on that scan line and the corresponding two pixels in the source image can then be found as described FIG. 5, after which the procedure in FIG. 6 can be carried out to map the pixels in this scan line onto the source image and transfer the corresponding pixel values from the source image back to the destination image. Then the same can be done for the next scan line, continuing in this manner until the entire destination image has been mapped.

Finally, a novel image transformation device for carrying out the image transformation method of the invention will be described with refernced to FIG. 7.

The first element of this image transformation device is a source image memory 41 for storing the source image. The source image memory 41 can be, for example, a semiconductor memory device in which pixel values are stored at addresses corresponding to the x-and y-coordinates of the pixel.

The next element is a destination image memory 42 for storing said destination image. The destination image memory 42 can be a separate memory device similar to the source image memory 41. Alternatively, the source image memory 41 and the destination image memory 42 can both be parts of the same physical memory device. The destination image memory 42 should preferably be structured so that the values of pixels on a scan line in the destination image are stored at a consecutive series of addresses.

The next element is an affine transformation means 43 for performing an affine transformation on vertices of the source image to generate vertices of the destination image. The affine transformation means 43 may comprise, for example, a special-purpose arithmetic unit for performing matrix multiplication as discussed in relation to FIG. 4.

The next element is an edge mapping means 44 for mapping pixels on edges of the destination image to pixels on edges of the source image. The edge mapping means 44 may comprise, for example, a special arithmetic unit for executing the DDA algorithm described in FIG. 5.

The next element is a scan line mapping means 45 for mapping pixels on scan lines in the destination image to pixels in the source image. The scan line mapping means 45 may comprise, for example, a special arithmetic unit for executing the DDA algorithm described in FIG. 6.

The next element is a controller means 46 for controlling the affine transformation means 43, the edge mapping means 44, and the scan line mapping means 45, and for transferring values of pixels from the source image memory 41 to the destination image memory 42 as indicated by the scan line mapping means 45. The controller means 46 may comprise, for example, a special-purpose processor executing a microprogram structured as in FIG. 1.

The next element is a data bus 47 for interconnecting the source image memory 41, the destination image memory 42, and the controller means 46. The data bus 47 enables the controller means 46 to read and write pixel data at specified addresses in the source image memory 41 and the destination image memory 42.

The next element is a display means 48 for displaying images stored in the destination image memory 42. The display means 48 may comprise, for example, an interface circuit for reading pixel data from the destination image memory 42 in scan-line order and converting the pixel data to a video signal, and a cathode-ray-tube display for receiving the video signal and displaying an image by raster scanning.

Figure 7:
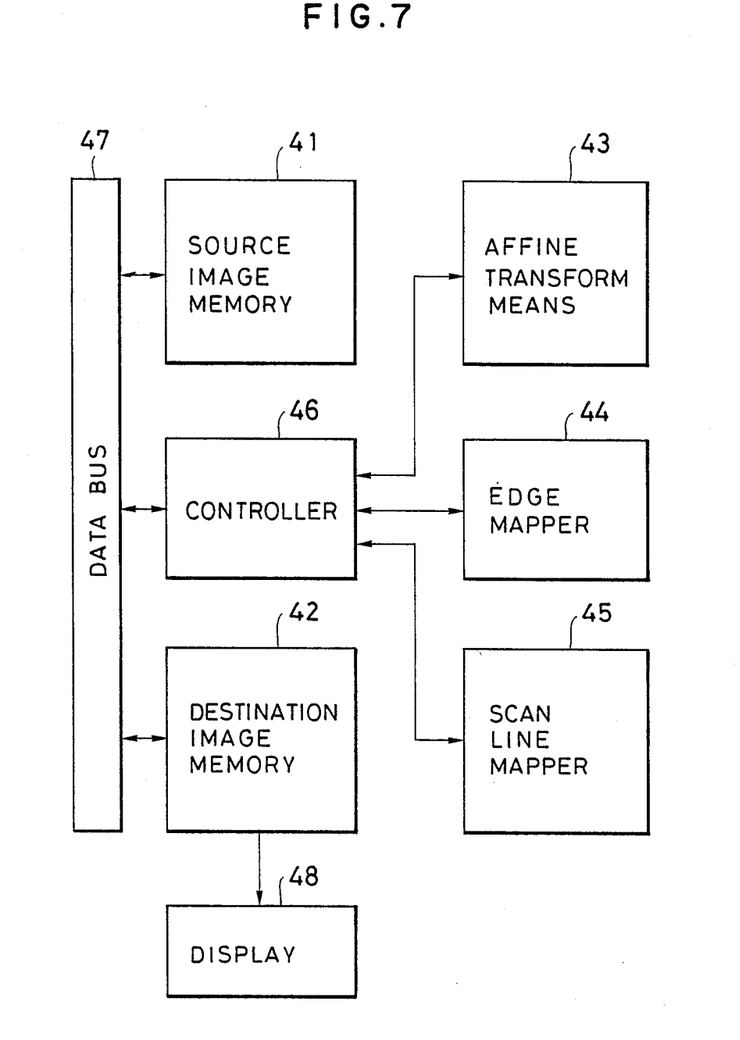
FIG. 7 is a block diagram of an image transformation device.

A detailed description of the operation of the image transformation device in FIG. 7 will be omitted as already having been covered in FIGS. 4 to 6. However, a brief description will be given of the operation of the controller means 46.

The controller means initiates the image transformation process when it receives the coordinates of the vertices of the source image and a command specifying the transformation or transformations to be performed. These coordinates and command can be received from an external device such as a computer not shown in the drawing.

The controller means 46 is coupled to the affine transformation means 43, with which it exchanges information. The controller means 46 sends the affine transformation means 43, for example, the coefficients of a series of one or more affine transformation matrices and causes the affine transformation means 43 to multiply these matrices to generate a product matrix; then the controller means 46 sends the affine transformation means 43 the vertex coordinates of the source image, causes the affine transformation means 43 to multiply these by the product matrix, and receives the results, which it stores as the coordinates of the vertices of the destination image in a working memory not shown in the drawing.

The controller means 46 is also coupled to the edge mapping means 44, to which is provides, for example, the coordinates of the vertices of the source and destination images and from which it receives, for example, a list of coordinates of pixels disposed on edges of the destination image and coordinates of corresponding pixels disposed on edges of the source image.

The controller means 46 is also coupled to the scan line mapping means 45, to which it provides, for example, the coordinates of pixels at the ends of a scan line on the destination image, and from which it receives, for example, a list of coordinates of pixels in the source image corresponding to successive pixels on the scan line in the destination image. The controller means 46 then converts the received coordinates to addresses, accesses the source image memory 41 at these addresses, reads pixel values therefrom, and writes these values at successive addresses in the destination image memory 42.

The scope of this invention is not restricted to the specific methods shown in FIG. 4 to 6, but includes many modifications of these methods which will be apparent to one skilled in the art. In addition, the affine transformation means, edge mapping means, scan line mapping means, and controller means in FIG. 7 need not comprise special-purpose arithmetic and processor units, but may be software means comprising programs executed on a general-purpose computer, and the display means may comprise any type of raster output device, such as a laser printer, instead of a cathode-ray-tube display. Finally, although FIGS. 2 and 3 illustrated only a rotation followed by an enlargement, this invention is applicable to any type of affine image transformation.

What is claimed is:

1. An image transformation method for transforming a rectangular source image formed by pixels in a two-axis coordinate system to a destination image formed by pixels disposed on scan lines, comprising the steps of:
    (a) mapping vertices of said source image onto vertices of said destination image by a coordinate transformation;
    (b) finding intersections of scan lines with edges of said destination image and mapping these intersections onto edges of said source image;
    (c) mapping scan lines in said destination image onto said source image, and assigning to pixels on said scan lines the values of corresponding pixels in said source image; and
    (d) displaying said destination image by scanning according to said scan lines.

2. The method of claim 1, wherein step (b) comprises steps of:
    (b1) computing coordinates of the ends of respective scan lines on said destination image;
    (b2) determining an increment value;
    (b3) initializing a source coordinate;
    (b4) iteratively updating said source coordinate by adding said increment value;
    (b5) taking the integer parts of respective updated source coordinates; and
    (b6) obtaining the coordinates of corresponding pixels on the edges of said source image according to said integer parts.

3. The method of claim 2, wherein said increment value is determined by dividing the height of an edge of said destination image into the length of a corresponding edge of said source image.

4. The method of claim 3, wherein said source coordinate is initialized to a coordinate of a vertex of said source image plus one-half said increment value.

5. The method of claim 1, wherein step (c) comprises steps of:
   (c1) selecting an initial destination pixel on a scan line in said destination image;
   (c2) calculating a pair of increment values;
   (c3) initializing a pair of source coordinates;
   (c4) taking the integer parts of said pair of source coordinates;
   (c5) assigning to said destination pixel the value of a pixel disposed in said source image at a location specified by said integer parts of said pair of source coordinates;
   (c6) deciding whether said destination pixel is the last pixel on said scan line in said destination image; and
   (c7) if said destination pixel is not the last pixel on said scan line in said destination image, updating said pair of source coordinates by adding thereto said pair of increment values, selecting the next destination pixel on said scan line, and returning to step (c4).

6. The method of claim 5, wherein said pair of increment values are calculated by dividing the length of said scan line in said destination image into the directed lengths along respective axes of a corresponding line in said source image.

7. the method of claim 6, wherein said pair of source coordinates are initialized by adding half the values of said pair of increment values to coordinates of a pixel at one end of said corresponding line in said source image.

8. The method of claim 7, wherein a further value of one is added to the initial value of one of said source coordinates.

9. An image transformation method for transforming a rectangular source image formed by pixels in a two-axis coordinate system to a destination image formed by pixels disposed on scan lines, comprising the steps of:
   (a) mapping vertices of said source image onto vertices of said destination image, said mapping vertices of said source image step including the substeps of;
      (a1) receiving parameters describing one or more affine transformations;
      (a2) combining said parameters to generate a product transformation; and
      (a3) applying said product transformation to said vertices of said source image;
   (b) finding intersections of scan lines with edges of said destination image and mapping these intersections onto edges of said source image;
   (c) mapping scan lines in said destination image onto said source image, and assigning to pixels on said scan lines the values of corresponding pixels in said source image; and
   (d) displaying said destination image by scanning according to said scan lines.

10. An image transformation device for transforming a rectangular source image formed by pixels in a two-axis coordinate system to a destination image formed by pixels disposed on scan lines, comprising:
   a source image memory for storing said source image;
   a destination image memory for storing said destination image;
   affine transformation means for performing an affine transformation on vertices of said source image to generate vertices of said destination image;
   edge mapping means for mapping pixels on edges of said destination image to pixels on edges of said source image;
   scan line mapping means for mapping pixels on scan lines in said destination image to pixels in said source image;
   controller means for controlling said affine transformation means, said edge mapping means, and said scan line mapping means, and for transferring values of pixels from said source image memory to said destination image memory as indicated by said scan line mapping means;
   a data bus for interconnecting said source image memory, said destination image memory, and said controller means; and
   display means for displaying images stored in said destination image memory.

11. The device of claim 9, wherein for each edge of said destination image, said edge mapping means maps one pixel for each scan line meeting said edge of said destination image.

12. The device of claim 11, wherein said edge mapping means receives a source coordinate and increment value from said controller, iteratively updates said source coordinate by adding said increment value, and calculates the coordinates of pixels on the edges of said source image by taking the integer parts of respective updated source coordinates.

13. The device of claim 12, wherein said controller calculates said increment value by dividing the height of an edge of said destination image into the length a corresponding edge of said source image.

14. The device of claim 13, wherein said controller calculates said source coordinate by adding one-half said increment value to a coordinate of a vertex of said source image.

15. The device of claim 10, wherein said scan line mapping means receives a pair of increment values and a pair of source coordinates from said controller, iteratively updates said pair of source coordinates by adding said pair of increment values, and calculates the coordinates of pixels in said source image by taking the integer parts of respective updated pair of source coordinates.

16. The device of claim 15, wherein said controller calculates said pair of increment values by dividing the length of a scan line in said destination image into the lengths along respective axes of a corresponding line in said source image.

17. The device of claim 16, wherein said controller calculates said pair of source coordinates by adding half the values of said pair of increment values to the coordinates of a pixel at one end of said corresponding line in said source image.

18. The device of claim 17, wherein said controller adds a further value of one to the value of one of said source coordinates.

19. The device of claim 10, wherein said affine transformation means performs matrix multiplication to calculate a product transformation, and to apply said product transformation to said vertices of said source image.

* * * * *